United States Patent
Hamedani et al.

(10) Patent No.: US 6,560,242 B1
(45) Date of Patent: May 6, 2003

(54) METHOD AND APPARATUS FOR CONNECTION FORMAT CONVERSION IN A COMMUNICATIONS NETWORK

(75) Inventors: Roxana Hamedani, Ottawa (CA); Nutan Behki, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/293,296

(22) Filed: Apr. 16, 1999

(51) Int. Cl.[7] .............................. H04J 3/16; H04J 3/22
(52) U.S. Cl. ...................................... 370/467
(58) Field of Search .................. 370/466, 467, 370/395.1, 389, 395.5, 395.52, 395.53, 395.63, 395.64, 395.65, 395.6, 395.61, 395.62, 395.7, 395.71, 395.72

(56) References Cited

U.S. PATENT DOCUMENTS

| | | | | |
|---|---|---|---|---|
| 5,452,297 A | * | 9/1995 | Hiller et al. | 370/395.61 |
| 5,689,550 A | * | 11/1997 | Garson et al. | 379/88.18 |
| 5,982,783 A | * | 11/1999 | Frey et al. | 370/395.6 |
| 6,094,431 A | * | 7/2000 | Yamato et al. | 370/395.21 |
| 6,243,383 B1 | * | 6/2001 | Li et al. | 370/395.6 |
| 6,262,992 B1 | * | 7/2001 | Nelson et al. | 370/426 |
| 6,301,251 B1 | * | 10/2001 | Kim et al. | 370/395.43 |
| 6,349,097 B1 | * | 2/2002 | Smith | 370/390 |
| 6,392,994 B1 | * | 5/2002 | Dubuc | 370/230 |

OTHER PUBLICATIONS

U.S. patent application Publication No. US 2002/0145977, Delattre et al., Oct. 10, 2002., Method For The Control Of Flows Within An ATM Switch With Distributed Architecture., p. 1 [0009].*

* cited by examiner

*Primary Examiner*—Wellington Chin
*Assistant Examiner*—Jamal Fox

(57) ABSTRACT

A method and apparatus for converting UBR and nrt-VBR connections to ABR connections in an ATM network is presented. In response to receiving a connection set-up message for a UBR or nrt-VBR connection, it is determined it is determined whether the port contemplating conversion is commissioned as a conversion port, which enables it to perform such conversions. If the port is a conversion port, it is determined whether or not the port type of the ingress port and the port type of the egress port support connection format conversion. If the port types support connection format conversion, it is determined whether or not the set-up message for the connection indicates that the connection is conversion enabled. If the connection is conversion enabled and the ports are of the right configuration, the set-up message is converted from the nrt-VBR or UBR format to an ABR format for transmission. Upon determination that the connection has successfully been established, the data packets for the connection are converted to ABR format and transmitted through the data communications network.

26 Claims, 4 Drawing Sheets

METHOD AND APPARATUS FOR CONNECTION FORMAT CONVERSION IN A COMMUNICATIONS NETWORK

TECHNICAL FIELD OF THE INVENTION

The invention relates generally to communication systems, and more particularly a method and apparatus for connection format conversion in communication systems.

BACKGROUND OF THE INVENTION

Communication between a calling party and a called party may be established over a communication network. Such a communication network may include a plurality of network switches that transport data in one of a variety of data transport protocols. Asynchronous transfer mode (ATM) technology is becoming the technology of choice for such broadband data communications. Within such ATM systems, a number of different service categories exist to facilitate the needs of different users.

Service categories supported by ATM can be grouped into real-time and non-real-time service categories. Real-time service categories include constant bit rate (CBR) and real-time variable bit rate (rt-VBR). Non-real-time service categories including non-real-time variable bit rate (nrt-VBR), available bit rate (ABR), and unspecified bit rate (UBR). Each of these different service categories includes a set of parameters that characterize the traffic contract that controls transmission of data within the data communications network. These parameters define the quality of service (QoS) for each given connection within the ATM network.

Nrt-VBR can be characterized as a bandwidth-on-demand (BOD) service category that tends to be used in non-real-time applications that are "bursty" in nature, where "bursty" indicates that the data is often transmitted in short, concentrated, bursts. These types of connections typically require a committed cell loss ratio (CLR), which is expected to remain constant during the existence of the connection. The UBR service category is typically associated with non-real-time applications that have no service guarantee required by the ATM network. UBR is typically associated with a BOD type of connection that uses the leftover bandwidth in the network once all other service categories have consumed their bandwidth requirements.

When connections are established for UBR and nrt-VBR service categories, the characteristics of the connection are often dependent on available resources within the network at that particular time. In many cases, the available resources in the network change during the existence of the connection. However, once a UBR or nrt-VBR connection is established, the parameters that describe the data carrying capacity of the connection cannot be altered unless the connection is terminated and reestablished. This can lead to inefficient use of network resources, as additional bandwidth carrying capability may be present but not utilized because of the lack of feedback in UBR and nrt-VBR connections.

Therefore, a need exists for a method and apparatus that allows for nrt-VBR and UBR connections to be provided with the means to adjust data transmission rates based on current network characteristics.

DETAILED DESCRIPTION OF A PREFERRED EMBODIMENT

Generally, the present invention provides a method and apparatus for converting UBR and nrt-VBR connections to ABR connections. In response to receiving a connection set-up message for a UBR or nrt-VBR connection, it is determined whether the port contemplating conversion is commissioned as a conversion port, which enables it to perform such conversions. If the port is a conversion port, it is determined whether or not the port type of the ingress port and the port type of the egress port support connection format conversion. If the port types support connection format conversion, it is determined whether or not the set-up message for the connection indicates that the connection is conversion enabled. If the connection is conversion enabled and the ports are of the right configuration, the set-up message is converted from the nrt-VBR or UBR format to an ABR format for transmission. Upon determination that the connection has successfully been established, the data packets for the connection are converted to ABR format and transmitted through the data communications network. Because ABR connections allow for feedback that improves network efficiency, UBR and nrt-VBR connections which are converted to ABR are able to take advantage of the feedback capability the ABR service category.

Figure 1:
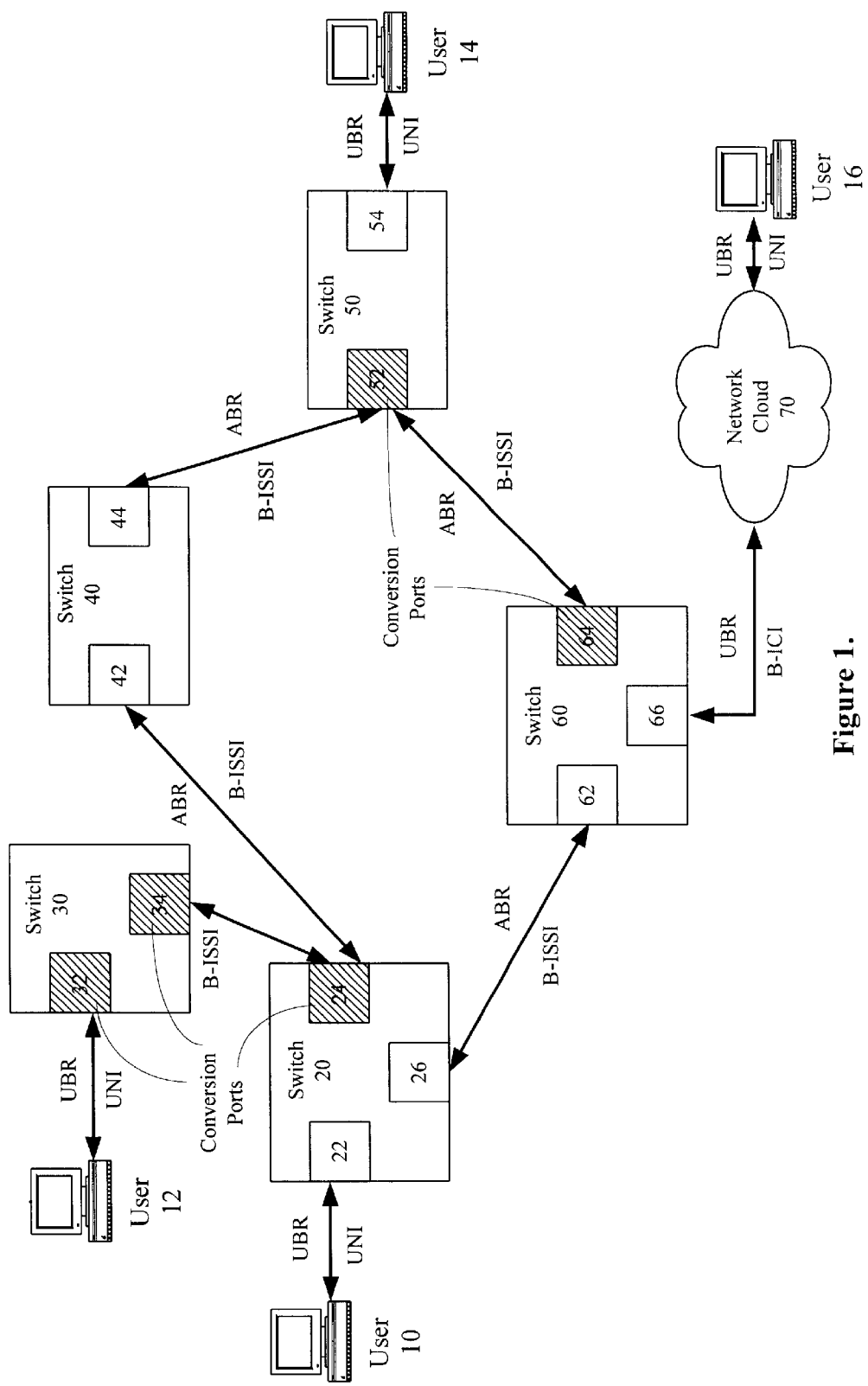
FIG. 1 illustrates a communications network in accordance with the present invention.

The invention can be better understood with reference to FIGS. 1–4. FIG. 1 illustrates a communications network that includes a plurality of switches, the users associated with those switches, and an interface to another external network 70. User 10 is coupled to the switch 20 via a user network interface (UNI) connection, which carries information using the UBR service category. A similar connection couples the user 14 to the switch 50. Assuming that the user 10 wishes to establish a connection with the user 14, the switch 20 can transmit the data to the switch 50 via switch 40. Note that assuming no conversion is performed by the switch 20, the entire connection will be set up in UBR format, which provides for no feedback mechanism to increase or decrease data transmission rate. However, if it is possible to convert the UBR format connection to an ABR connection between the switch 20 and the switch 50, the feedback provided by ABR can be utilized to maximize the efficiency of the network between these connection points.

As is known in the art, ABR includes a feedback mechanism that allows for the transfer characteristics of an ABR connection to change after the connection has been established. This feedback mechanism is discussed in The ATM Forum Traffic Management Specification Version 4.0 (April 1996). The feedback is provided to the source such that the rate of transmission can be controlled in relation to the changing transfer characteristics of the network. Although ABR improves utilization of network resources, it does not provide the guaranteed level of bandwidth required for real-time applications.

When an ABR connection is established, a Peak Cell Rate (PCR) and a Minimum Cell Rate (MCR) are specified for the connection. The PCR determines the maximum required bandwidth for the connection, whereas the MCR determines the minimum useable bandwidth. The MCR may be set to zero, indicating that there is no guaranteed level of bandwidth across the connection.

Figure 2:
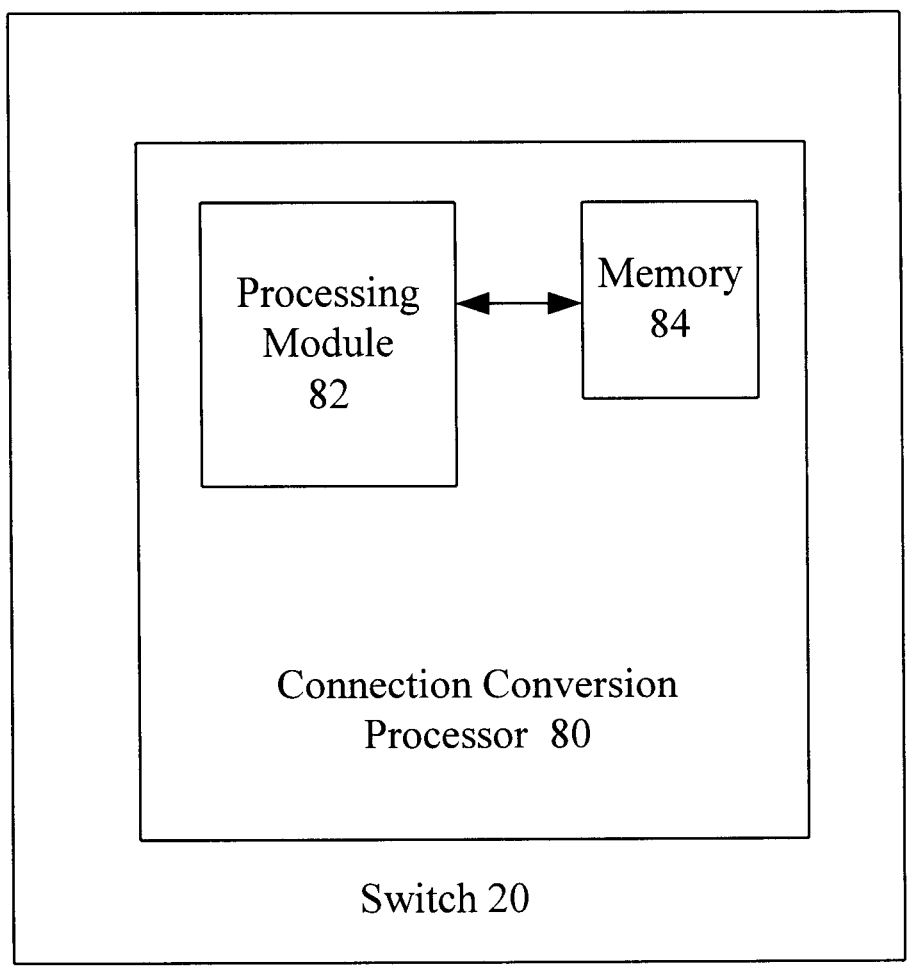
FIG. 2 illustrates a schematic block diagram of a switch that includes a connection conversion processor in accordance with the present invention.

FIG. 2 illustrates switch 20, which includes a connection conversion processor 80. The connection conversion processor 80 includes a processing module 82 and memory 84. The processing module 82 may include a single processing entity or plurality of processing entities. Such a processing entity may be a microprocessor, microcontroller, digital signal processor, state machine, logic circuitry, and/or any device that processes information based on operational and/or programming instructions. The memory 84 may be a single memory device or a plurality of memory devices. Such a memory device may be a read-only memory device, random access memory device, floppy disk, hard drive memory, and/or any device that stores digital information. Note that when the processing module 82 has one or more of its functions performed by a state machine and/or logic circuitry, the memory containing the corresponding operational instructions is embedded within the state machine and/or logic circuitry.

Figure 3:
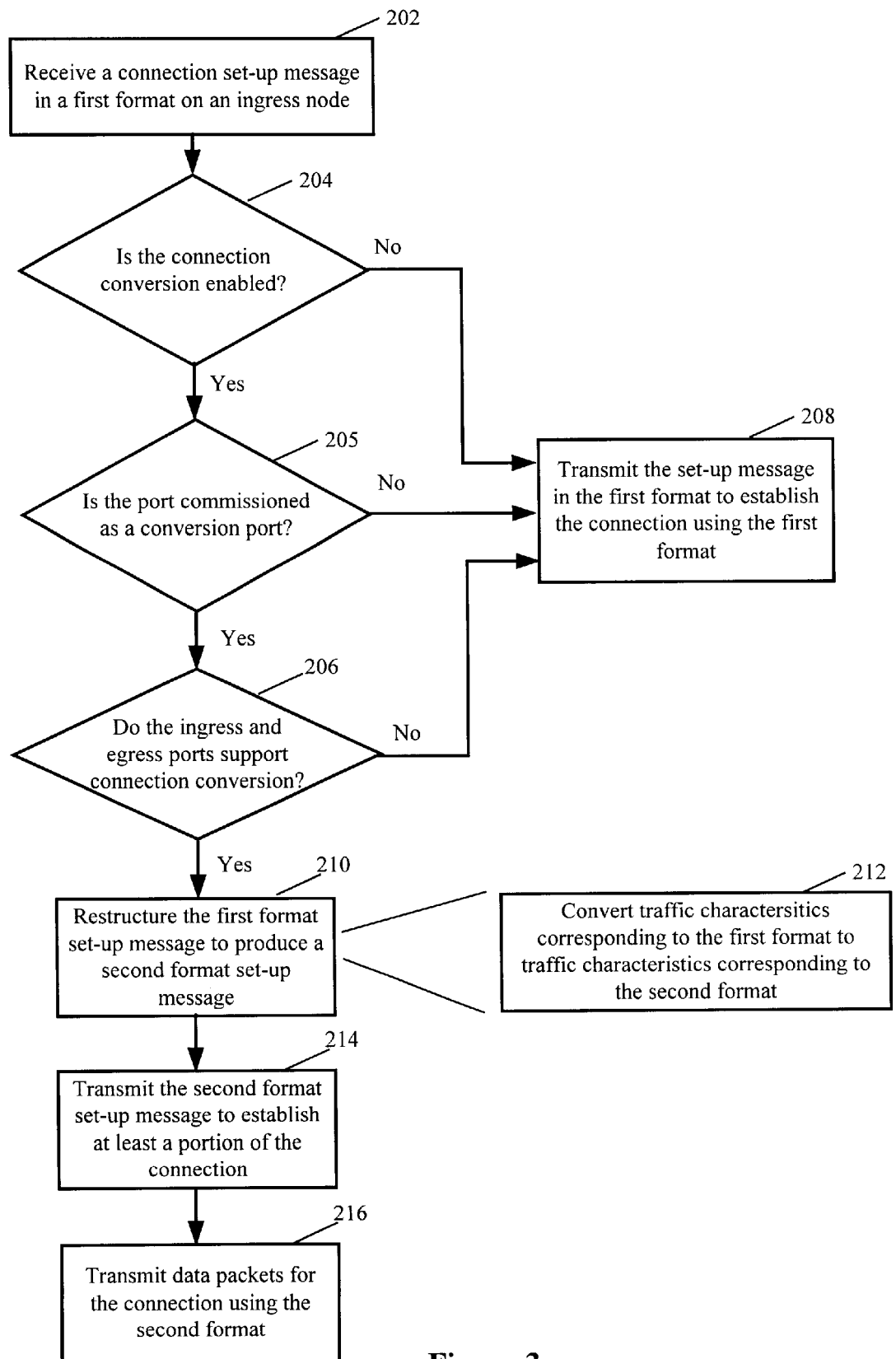
FIG. 3 illustrates a flow diagram of a method for connection conversion in a communications network in accordance with the present invention.
Figure 4:
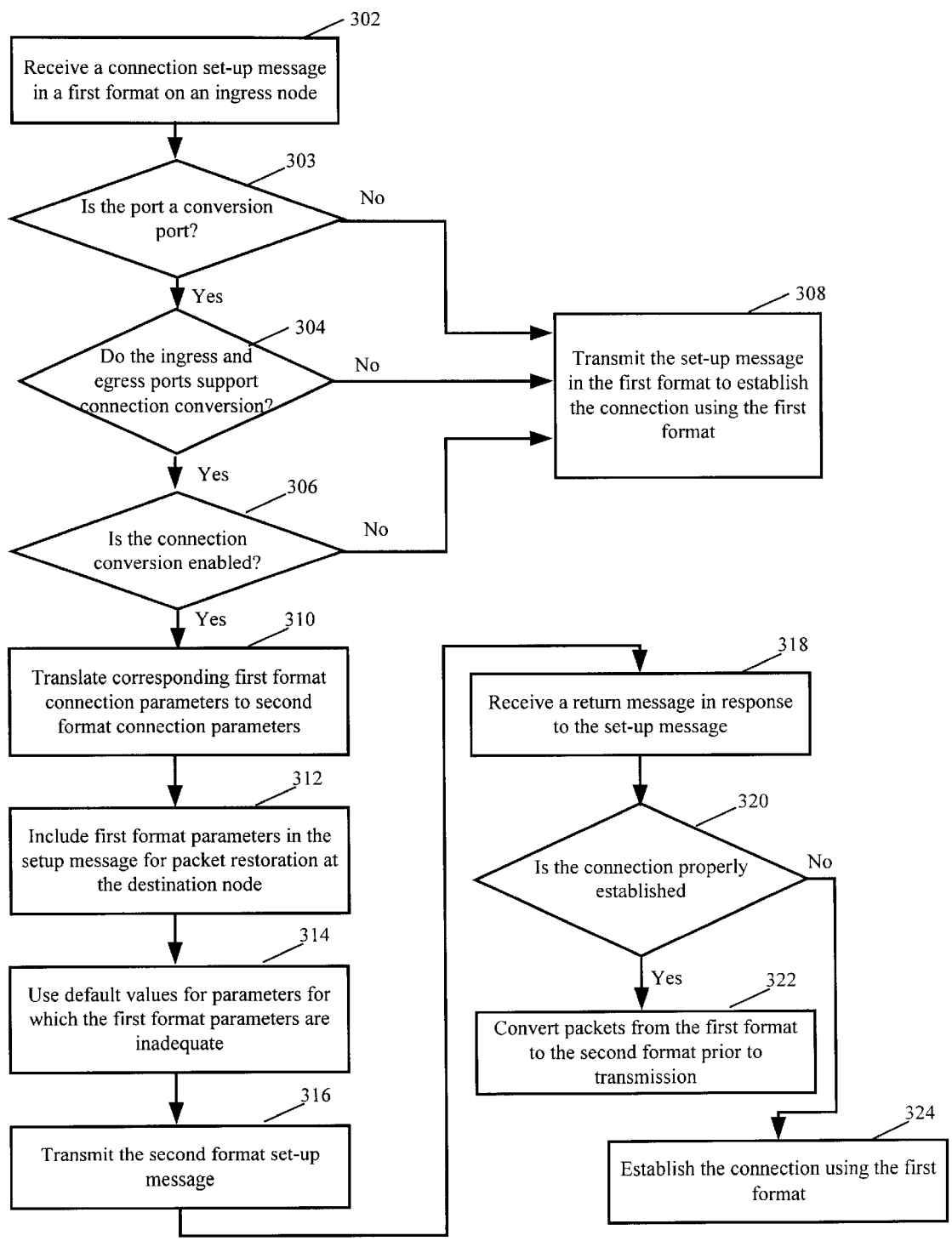
FIG. 4 illustrates a flow diagram of another method for connection conversion in a communications network in accordance with the present invention.

The memory 84 stores programming and/or operational instructions that allow the processing module 82 to perform the methods illustrated in FIGS. 3 and 4. FIG. 3 illustrates a flow diagram of a method for connection conversion that may be used to convert nrt-VBR and UBR connections to ABR connections. The process begins at step 202, where a first format set-up message for a connection is received. The first format set-up message is received at an ingress port of a source node. Referring to FIG. 1, the set-up message may be received at port 22 of the switch, or node, 20. The set-up message received may indicate that the user 10 wishes to establish a connection with the user 14.

Returning to FIG. 3, at step 204, it is determined whether or not the set-up message indicates that the connection is conversion enabled. Preferably, the user is able to determine whether or not the connection that he or she wishes to establish is eligible to be converted to another format such as ABR. Therefore, if the user indicates that the connection is not conversion enabled, the system proceeds to step 208, where the set-up message is transmitted in the first format and the connection is established using the first format. Preferably, the first format includes UBR and nrt-VBR formats in an ATM communications network. However, it should be noted that the first format may include other data communications formats that also lack the feedback and network utilization capabilities that formats such as ABR provide.

One reason that a user may configure a connection to be non-convertible is because of the potential "burstiness" that can exist with an ABR connection. For example, if the recipient of the data transmission expects the data at a fairly steady rate, it may be surprised to receive large bursts of data that could potentially overwhelm its buffering capabilities. For this reason, the user may include in the set-up message an indication that the connection should not be converted.

Once it is determined that the connection is conversion enabled, the method proceeds to step 205, where the port contemplating performing the conversion determines whether or not it is commissioned as a conversion port. Referring to FIG. 1, the ports that are shaded, namely ports 32, 34, 24, 52, and 64, have been commissioned as conversion ports. If the port is commissioned as a conversion port, it is enabled to perform conversions if the ingress and egress ports for the data support conversion, which is determined at step 206. If the port is not commissioned, no conversion can take place regardless of the ingress and egress port configuration, and the method proceeds to step 208 where the connection is established using the first format.

At step 206, the ingress and egress ports are examined to determine whether or not connection conversion would be beneficial to the system. It should be noted that steps 204 and 206 may be performed in the opposite order or in parallel, and the ordering of these steps is unimportant to the end result of the method. In order to determine whether or not the port type of the ingress port and the port type of the egress port support connection conversion, the information included in the following table is preferably utilized to make the determination.

| INGRESS PORT TYPE | EGRESS PORT TYPE | ACTION |
| --- | --- | --- |
| UNI | B-ISSI | Convert to ABR |
| B-ISSI | UNI | Revert to original |
| B-ICI | B-ISSI | Convert to ABR |
| B-ISSI | B-ICI | Revert to original |
| UNI | B-ICI | No conversion |
| B-ICI | UNI | No conversion |
| B-ISSI | B-ISSI | No conversion |
| UNI | UNI | No conversion |
| B-ICI | B-ICI | No conversion |

The data contained in the table corresponds to providing for conversion of connections when it is appropriate within a communications network. Primarily, the conversions are performed such that ABR connections are maintained across backbones within a particular network, but when an interface exists between the backbone and either a user or another network, the converted connection is returned to its original format.

Typically, the backbone within a network will utilize a broadband inter-switching system interface (B-ISSI). This is the standard interface used to connect network ports within the same ATM cloud, and may be referred to as a network-to-network interface (NNI). As shown earlier, user network interfaces (UNIs) are used to interface the ATM network to ATM user equipment. The broadband intercarrier interface (B-ICI) is typically used to interface two different ATM clouds. Based on this, the table illustrated above shows that when a user-initiated connection arrives on a UNI ingress port, and is provided to the internal backbone of the network, which is most likely a B-ISSI interface, the connection may be converted to ABR. Similarly, when a connection is received on a B-ISSI port, and provided to a user on a UNI port, the connection is returned to its original format. The B-ICI interfaces are treated in the same manner as UNI interfaces, as connections with additional ATM, or other networks, are treated in the same manner as connections to a user. As such, conversion is performed at the interface to another network in the same manner it is performed at the interface to a user. Thus, the only times when conversion or reversion to the original format is applicable is on the borders of the ATM cloud.

Returning to FIG. 3, if the ingress and egress ports do not support connection conversion, the method proceeds to step 208 where the set-up message is transmitted and the connection is established using the first format. If it is determined at step 206 that the ingress and egress ports support connection conversion, the method proceeds to step 210 where the first format set-up message is restructured to produce a second format set-up message. Thus, referring to FIG. 1, at the egress port 24, the set-up message corresponding to the connection between the user 10 and the user 14 will be converted to a second format set-up message.

Preferably, the second format is a format that includes some type of feedback such as that provided by ABR such that utilization of network resources is optimized.

Preferably, restructuring the first format set-up message to produce the second format set-up message includes converting traffic characteristics corresponding to the first format to traffic characteristics corresponding to the second format. This is accomplished at step 212. As stated earlier, each of the ATM service categories have set-up parameters that are used to describe the connection requirements for that particular service category. A preferred conversion set is illustrated in the following tables. These tables illustrate the preferred conversions from nrt-VBR to ABR and UBR to ABR. In the case where the second format, which is preferably ABR, includes some additional traffic parameters that are not specified by the first format, which preferably includes nrt-VBR and UBR, default values for the second format parameters may be utilized. In the case of ABR being the second format, the default values may be those as specified by the ATM Forum.

| nrt-VBR Parameters | Derived ABR Parameters |
| --- | --- |
| PCR | PCR |
| SCR | MCR, ICR |
| MBS | (use default ABR parameter) |
| CLR | (use default ABR parameter) |
| CDVT | CDVT |
| Traffic Descriptor PO+1/SO+1 | Traffic Descriptor PO+1/MO+1 |
| Traffic Descriptor PO+1/SO | Traffic Descriptor PO+1/MO+1 |

| UBR Parameters | Derived ABR Parameters |
| --- | --- |
| PCR | PCR |
| MCR | MCR, ICR |
| CDVT | CDVT |
| Traffic Descriptor PO+1/MO+1 | Traffic Descriptor PO+1/MO+1 |

The minimum cell rate (MCR) value which indicates the quantitative commitment that the network makes for a given ABR connection is initialized to correspond to either the sustained cell rate (SCR) of the original nrt-VBR, or to the minimum cell rate (MCR) of the original UBR connection. It should also be noted that the initial cell rate (ICR) value is initialized to the same value as the MCR. Other parameters shown in the table include the maximum burst size (MBS), the cell loss ratio (CLR), and the cell delay variation tolerance (CDVT).

Once the first format set-up message has been restructured to a second format set-up message, the second format set-up message is transmitted at step 214. The transmission of the second format set-up message establishes at least a portion of the connection requested by the user. Referring back to FIG. 1, the second format set-up message will establish an ABR connection between the port 24 of switch 20 through the ports 42 and 44 of switch 40, neither of which is a conversion port, to the conversion port 52 of switch 50. Thus, between port 24 and port 52, the connection will utilize the ABR service category, whereas at port 52, the reverse conversion will be performed such that the connection between the port 54 and the user 14 is a UBR connection.

Once the connection has been established, at step 216 the data for the connection are transmitted using the second format. Preferably, when the set-up message in the second format is initially transmitted, the parameters for the first format connection are included in the set-up transmission. More preferably, these parameters are included in the generic application transport information elements (GAT IE) of the set-up message. As such, the destination conversion node within the network can use these first format parameters that have been transmitted to reconstruct the data packets in the original first format. The GAT IE is used to store this data as it is not interfered with when passed through various switches in the network. As such, switches that are not capable of performing conversion or support of the conversion described herein may be used in networks along with switches performing the conversion. This allows for backward compatibility with prior art switches and those provided by other manufacturers that are compliant with the ATM standard.

Referring back to FIG. 1, it can be seen that connections between the user 10 and the user 14 can be enhanced by performing UBR to ABR conversion at the egress port 24, and reversing that conversion at the ingress port 52 such that an ABR connection is utilized across the backbone of the network. Similarly, the user 14 may communicate with other users, such as user 16, coupled to an external network cloud 70 through the use of the conversion port 64 on the switch 60. Note that the switch 60 also includes non-conversion port 62 and 66, such that a connection between the user 10 through switch 20 and switch 60 to another user coupled to the network cloud 70 may be performed without any type of conversion. By enabling connections within a communications network to utilize the feedback and network capabilities of ABR connections for other non-real-time connections, network efficiency can be increased.

FIG. 4 illustrates another method for connection format conversion in a communications network. The method begins at step 302, where a connection set-up message in a first format is received on an ingress node. This is similar to step 202 of FIG. 3. At step 303, it is determined whether or not the port contemplating performing the conversion is commissioned as a conversion port, which is similar to step 205 of FIG. 3. Once again, if the port is not commissioned, no conversion can take place, and the connection is set up using the first format at step 308.

At step 304, it is determined whether or not the ingress and the egress ports support connection conversion. This step is similar to step 206 of FIG. 3, and the associated table used in conjunction with the description of step 206 is also appropriate to determine whether the ports support conversion.

If it is determined at step 304 that the ingress and egress ports do not support connection conversion, the set-up message is transmitted in the first format and the connection is established and maintained using the first format. If it is determined that the ports do support connection conversion, the method preferably proceeds to step 306 where it is determined whether or not the set-up message indicates that the connection is conversion enabled. This is similar to step 204 of FIG. 3. Once again, the ordering of steps 304 and 306 may be reversed, or the steps may be performed in parallel. If it is determined that the connection is not conversion enabled, the method proceeds to step 308 where the connection is set up and maintained using the first format.

If it is determined that the connection is conversion enabled and the ports support conversion, the method proceeds to step 310 where the process of converting the first format set-up message to a second format set-up message initiates. At step 310, corresponding first format connection parameters are translated to second format connection parameters, in a manner similar to that described at step 212 of FIG. 3. Preferably, the translation occurs based on the information included in the table associated with step 212. At step 312, the first format parameters of the first format set-up message are included in the second format set-up message to be sent. As stated earlier, these parameters are preferably stored in the GAT IE of the message and can be utilized by the destination node for reconstruction of the first format data packets from data packets structured in the second format which are received. When translating corresponding first format connection parameters to second format connection parameters, there may be some parameters in the second format for which there is no analogous parameter in the first format. In these cases, default values are preferably used at step 314 to substitute in these areas where first format parameters are inadequate.

At step 316, the second format set-up message is transmitted through the network to the destination conversion node. In response, the destination conversion node will generate a return message to indicate that the set-up message was received and the connection has been established. At step 318, the source conversion node receives the return message in response to the set-up message.

At step 320, the return message is examined to determine whether or not the connection has been properly established in the second format. Preferably, this determination may be based on examining a counter value stored within the GAT IE of the return message. In order to determine whether or not the second format set-up message is properly handled within the network, a counter within the GAT IE can be utilized to determine the number of conversions that occur for a particular data packet. Once again, the GAT IE is employed for the storage of the counter value as it is a data field within the packet that is passed by other switches in the network without consequence. In this way, the count can be maintained without affecting other nodes within the network.

Preferably, upon initial transmission, this counter is incremented to a value of 1 indicating that the data has been converted one time. On its initial transmission path, each time the data packet is converted between the first and second formats, the counter will be incremented by one. In the reverse direction for the connection, the first conversion port along the backward direction checks for the existence of the GAT IE count. If there is no such GAT IE count present, it generates one for the call and fills its conversion port count with the counter value that was previously stored on the connection control for that particular connection. Only the conversion port that generates the GAT IE count in the reverse direction marks the conversion port count. All other conversion ports only mark this field in the forward direction. The source of the connection can then use this count to determine whether or not the number of conversion ports through which the call or connection paths is even. If the number stored within the GAT IE counter is even, then the connection has been converted to and from the second format, which is preferably ABR, correctly.

If the counter stores an odd counter value, the conversion to and from ABR has been performed incorrectly, and returning to FIG. 4, the method proceeds to step 324 where the connection is established using the first format. If the connection has been properly established, the method proceeds to step 322 where data packets are converted from the first format to the second format prior to transmission.

Use of this counter value within the GAT IE can be better understood by referring to FIG. 1. Using a connection between the user 10 and the user 14 for a first example, it can be seen that when the conversion at port 24 occurs, the GAT IE counter will be initialized with the value of 1. As the set-up message is transported through the switch 40, no conversion occurs, and the count remains at 1. When the message arrives at the switch 50, it is converted from ABR back to UBR by the port 52, which increments the counter to a value of 2. When the return call has been generated by the user 14, the port 52 recognizes this message as the return message corresponding to the connection that it recently passed. As such, the port 52 will look to determine if there is already a GAT IE count in the return message. Because no other conversion has yet occurred for this return message, the port 52 will insert the GAT IE count corresponding to the initial set up message that corresponds to this particular connection. Thus, the GAT IE count will be set to the value of 2. On its return trip, the conversion ports in the network will not increment this count value, and when the return call arrives at the port 24, the even value will indicate that the conversion within the network has occurred properly.

To illustrate when an incorrect conversion is determined, a connection between the user 10 and the user 12 is used as an example. As before, the port 24 will perform the initial conversion and set the counter to a value of 1. The port 34 of the switch 30 will see that the ingress port is a B-ISSI and the egress port is a UNI, and therefore will return the converted connection to its original format. This is then passed through the conversion port 32, which does not need to duplicate the efforts of conversion port 34. Therefore, the conversion port 34 will store a count value for this particular connection of 2. On its return, the conversion port 32 will see that the ingress port is a UNI port, and the egress port is a B-ISSI port. As such, the conversion port 32 will perform the connection conversion such that the UBR return call is converted to an ABR return call at the port 32. Because the port 32 did not perform any conversion on this connection when the incoming message was received, it has no stored GAT IE count for this connection. Additionally, no GAT IE count is yet stored in the return call, and as such, the conversion port 32 will initialize the count within the GAT IE counter to a value of 1. At the egress port 34, the conversion has already been performed, so the port 34 merely passes the connection without performing any conversion. Because it does not perform any conversion, the conversion port 34 will not insert the GAT IE value that it has stored for this particular connection. Therefore, when the return call arrives at the port 24, it contains a GAT IE count of 1, indicating that the conversion has occurred in the network improperly.

The improper conversion occurs within the switch 30. As can be seen, if the conversion port 34 performs the conversion of connections incoming to the switch 30, data will travel from the port 34 to the port 32 in UBR format. However, when return data is sent from the port 32 to the port 34, the port 32 will perform the conversion, resulting in ABR traffic moving from the port 32 to the port 34. This type of incorrect conversion may result in the conversion being aborted and the original format, in this case UBR, being used.

The present invention provides a method and apparatus for converting connections within the communications network to enable connections that would normally not include feedback mechanisms to take advantage of other connection types that include feedback mechanisms to allow for better network utilization. In the preferable data communications environment, an ATM network, UBR and nrt-VBR traffic can be converted to ABR traffic along the backbone of the network. The parameter set corresponding to ABR connections allows for UBR and nrt-VBR connections to the maintained in terms of their priority level by controlling the minimum cell rate (MCR) associated with the connections. For UBR connections, which normally have no guaranteed data carrying capacity, the MCR can be set to zero, such that no minimum cell rate for the connection is guaranteed. Within nrt-VBR connections, the minimum cell rate can be adjusted to suit the parameters associated with the nrt-VBR such that the quality of service for that connection is insured.

Because UBR connections provide no feedback, congestion or other network problems can cause large amounts of UBR data to be dropped after some portion of the transmission of the UBR data has occurred. Thus, UBR traffic may maneuver its way through the majority of the network before running into congestion that causes it to be dropped. In order to avoid such waste of bandwidth, converting these calls from UBR to ABR allows for feedback mechanisms build into ABR to be utilized to insure that large amounts of data are not transmitted merely to be dropped.

It should be understood that the implementation of other variations and modifications of the invention in its various aspects should be apparent to those of ordinary skill in the art, and that the invention is not limited to the specific embodiments described. For example, connections between ATM clouds may utilize the conversion as long as the same level of control is present at the end points of the conversion that exists within a typical ATM system. It is therefore contemplated to cover by the present invention, any and all modifications, variations, or equivalents that fall within the spirit and scope of the basic underlying principles disclosed and claimed herein.

What is claimed is:

1. A method for connection format conversion in a communications network, comprising:
   in response to receiving a connection set-up message for a connection in a first format on an ingress port, determining if port type of the ingress port and port type of an egress port support connection format conversion, wherein the ingress port and the egress port are included in a source node;
   when the port type of the ingress port and the port type of the egress port support connection conversion, converting the connection set-up message in the first format to a second format; and
   transmitting the connection setup message in the second format to establish at least a portion of the connection in the second format with a second format destination node.

2. The method of claim 1, wherein converting the connection set-up message further comprises converting connection parameters for the connection in the first format to corresponding connection parameters for the connection in the second format, wherein at least a portion of the connection parameters in the first format are included in the connection set-up message and used by the second format destination node to restore packets received in the second format to the first format.

3. The method of claim 2, wherein converting the connection set-up message further comprises using default values for second format connection parameters when corresponding first format connection parameters are insufficient to characterize the connection.

4. The method of claim 3 further comprises:
   determining if the connection is properly established using the second format based on a return message received in response to the connection setup message in the second format;
   when the connection is properly established using the second format, converting packets of the connection from the first format to the second format before transmission; and
   when the connection is not properly established using the second format, establishing the connection using the first format.

5. The method of claim 4, wherein determining if the connection is properly established using the second format further comprises verifying that the number of conversions between formats across the connection is even.

6. The method of claim 3, wherein the first format is a non real-time format, and wherein the second format provides a feedback path between the second format destination node and the source node, wherein the feedback path allows for modification to a data transfer rate within the connection.

7. The method of claim 6, wherein the first format is one of non-real-time variable bit rate (nrt-VBR) and unspecified bit rate (UBR), and the second format is available bit rate (ABR).

8. The method of claim 1, wherein determining if port type of the ingress port and port type of an egress port support connection format conversion further comprises:
   determining if the connection is conversion enabled;
   when the data is not conversion enabled, establishing the connection in the first format; and
   when the data is conversion enabled, determining if port type of the ingress port and port type of an egress port support connection format conversion.

9. A method for establishing a connection in a communications network comprising:
   receiving, at an ingress port of a source node, a first format set-up message for a connection;
   interpreting the first format set-up message to determine whether the connection is conversion enabled;
   when the connection is conversion enabled, restructuring the first format set-up message to produce a second format set-up message; and
   transmitting the second format set-up message to a second format destination node to establish at least a portion of the connection.

10. The method of claim 9 further comprises:
    when the connection is conversion enabled, determining if the port type of the ingress port and port type of an egress port of the source support conversion of the connection;
    when the port types of the ports support conversion, restructuring the first format set-up message to produce a second format set-up message; and
    when the port types of the ports do not support conversion, transmitting the first format set-up message.

11. The method of claim 10, wherein restructuring further comprises converting traffic characteristics corresponding to the first format to traffic characteristics corresponding to the second format.

12. The method of claim 9 further comprises, after establishing the at least a portion of the connection, transmitting data packets for the connection using the second format.

13. The method of claim 12, wherein the first format is non-real-time variable bit rate (nrt-VBR) and the second format is available bit rate (ABR).

14. The method of claim 12, wherein the first format is unspecified bit rate (UBR) and the second format is available bit rate (ABR).

15. A connection conversion processor comprising:

a processing module; and memory operably coupled to the processing module, wherein the memory includes operating instructions that cause the processing module to:

determine, in response to receiving a connection set-up message for a connection in a first format on an ingress port, if port type of the ingress port and port type of an egress port support connection conversion, wherein the ingress port and the egress port are included in a source node;

when the port type of the ingress port and the port type of the egress port support connection conversion, convert the connection set-up message in the first format to a second format; and transmit the connection setup message in the second format to establish at least a portion of the connection in the second format with a second format destination node.

16. The connection conversion processor of claim 15, wherein the memory further comprises operating instructions that cause the processing module to convert the connection set-up message by converting connection parameters for the connection in the first format to corresponding connection parameters for the connection in the second format, wherein at least a portion of the connection parameters in the first format are included in the connection set-up message and used by the second format destination node to restore packets received in the second format to the first format.

17. The connection conversion processor of claim 16, wherein the memory further comprises operating instructions that cause the processing module to convert the connection set-up message such that default values are used for second format connection parameters when corresponding first format connection parameters are insufficient to characterize the connection.

18. The connection conversion processor of claim 17, wherein the memory further comprises operating instructions that cause the processing module to:

determine if the connection is properly established using the second format based on a return message received in response to the connection setup message in the second format;

when the connection is properly established using the second format, convert packets of the connection from the first format to the second format before transmission; and when the connection is not properly established using the second format, establish the connection using the first format.

19. The connection conversion processor of claim 18, wherein the memory further comprises operating instructions that cause the processing module to determine if the connection is properly established using the second format by verifying that the number of conversions between formats across the connection is even.

20. The connection conversion processor of claim 15, wherein the first format is a non real-time format, and wherein the second format provides a feedback path between the second format destination node and the source node, wherein the feedback path allows for modification to a data transfer rate within the connection.

21. The connection conversion processor of claim 20, wherein the first format is one of non-real-time variable bit rate (nrt-VBR) and unspecified bit rate (UBR), and the second format is available bit rate (ABR).

22. The connection conversion processor of claim 15, wherein the memory further comprises operating instructions that cause the processor to:

prior to comparing the port type of the ingress port with the port type of the egress port, determine if the connection is conversion enabled;

when the data is not conversion enabled, establish the connection in the first format; and when the data is conversion enabled, compare the port type of the ingress port with the port type of the egress port.

23. A connection conversion processor comprises:

a processing module; and memory operably coupled to the processing module, wherein the memory includes operating instructions that cause the processing module to:

interpret a first format set-up message for a connection to determine whether the connection is conversion enabled, wherein the first format set-up message is received via an ingress port;

determine if the port type of the ingress port and the port type of an egress port support conversion of the connection;

when the connection is conversion enabled and the port types support conversion, restructure the first format set-up message to produce a second format set-up message; and transmit the second format set-up message to a second format destination node to establish at least a portion of the connection.

24. The connection conversion processor of claim 23, wherein the memory further comprises operating instructions that cause the processor to restructure the first format set-up message by converting traffic characteristics corresponding to the first format to traffic characteristics corresponding to the second format.

25. The connection conversion processor of claim 23, wherein the first format is non-real-time variable bit rate (nrt-VBR) and the second format is available bit rate (ABR).

26. The connection conversion processor of claim 23, wherein the first format is unspecified bit rate (UBR) and the second format is available bit rate (ABR).

* * * * *